July 2, 1968  J. C. DAWSON  3,390,696
CONTROL DEVICES
Filed Nov. 18, 1965
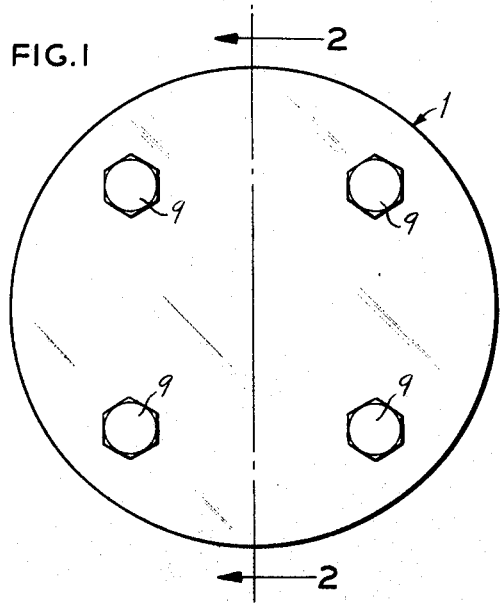
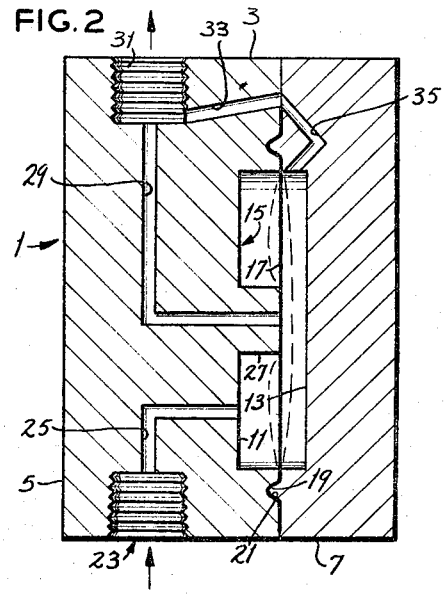
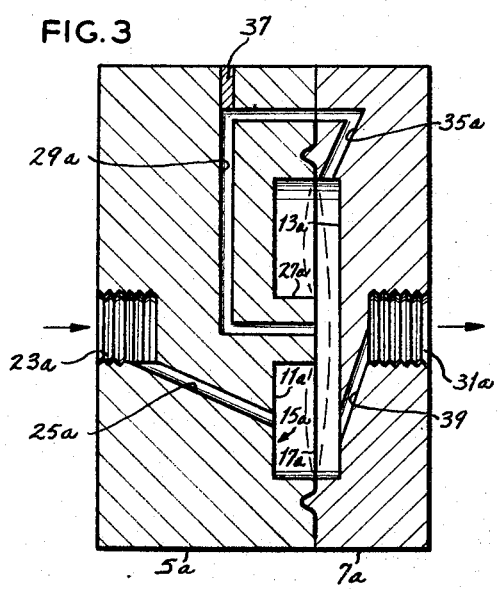
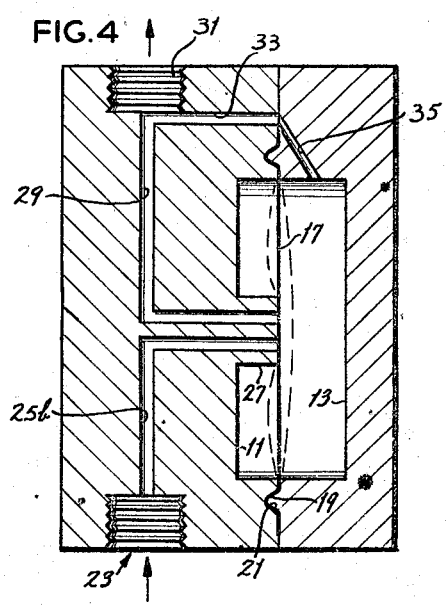
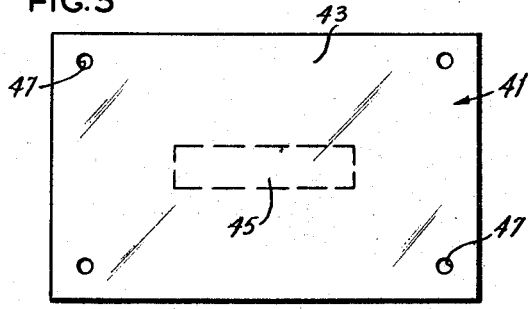
Joseph Carl Dawson,
INVENTOR.
BY John D. Pape III,
ATTORNEY.

United States Patent Office 3,390,696
Patented July 2, 1968

3,390,696
CONTROL DEVICES
Joseph Carl Dawson, 93 Ford Lane,
Hazelwood, Mo. 63042
Continuation-in-part of application Ser. No. 358,355,
Apr. 8, 1964. This application Nov. 18, 1965, Ser.
No. 508,533
4 Claims. (Cl. 137—496)

This invention relates to valves, and more particularly to check valves adapted to permit the flow of fluid in one direction, but prevent flow in an opposite direction.

This application is a continuation-in-part of my co-pending application Ser. No. 358,355, filed Apr. 8, 1964, now abandoned.

Briefly, this invention comprises a body having an inlet and an outlet leading to a cavity in the body, a diaphragm extending across the cavity thereby dividing it into two chambers, the diaphragm being adapted to open and close a port leading to the outlet in response to various pressure conditions on the inlet and outlet sides of the body.

Among the several objects of the invention may be noted the provision of a check valve which is thoroughly dependable under very low back-pressure conditions; the provision of a check valve which ejects a small quantity of fluid out through the inlet thereof when subjected to a back pressure, which small quantity of fluid can be used to perform useful work; the provision of a valve of the class described which is highly responsive and effectively prevents back flow when the pressure at its outlet exceeds the pressure at its inlet; and the provision of such a check valve which is simple and economical in construction. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated, FIG. 1 is a plan view of a check valve constructed in accordance with and embodying the present invention;

FIG. 2 is a section taken along line 2—2 of FIG. 1;

FIG. 3 is a section similar to FIG. 2 showing a second embodiment of this invention;

FIG. 4 is a section similar to FIG. 2 showing a third embodiment of this invention;

FIG. 5 is a plan view of a modified diaphragm which may be used when the chamber in the valve is rectangular in shape rather than circular in shape.

Corresponding reference characters indicate corresponding parts throughout the several views of the drawings.

There are many types of check valves adapted to permit the flow of fluid in one direction but prevent flow in an opposite direction. One of the most common types of check valves is the ball type which includes a sphere biased, by gravity or a spring, for example, toward a seat. Fluid, when forced through the valve in one direction, pushes the sphere off the seat, but when the force driving the fluid is stopped or when back pressure develops, the sphere is forced back on the seat to inhibit back flow. While the known types of check valves perform adequately in many situations, such valves are not entirely satisfactory under very low back-pressure conditions. Often such valves permit a slight amount of fluid to bleed back past the valve under low back-pressure conditions.

Moreover, in the chemical industry, in particular, it is often desirable to mix two or more liquids together, generally in a mixing chamber, which react somewhat violently in certain cases to form a desired end product. If for some reason one of the chemical feeder lines was subjected to a back pressure and chemicals from the other lines thereby forced into it, the reaction would occur in the particular feeder line subjected to the back pressure which would be undesirable. For this reason, check valves are often installed in such chemical feeder lines. Many check valves of current manufacture, however, are not responsive to low back pressures of a magnitude of three to four inches of water, and, therefore, cannot be utilized in conjunction with certain chemical mixing processes. An example of such a mixing process is disclosed in my copending application Ser. No. 361,201, filed Apr. 20, 1964, now U.S. Patent 3,245,585.

According to the present invention, a check valve is provided which is highly responsive and thoroughly dependable under very low back-pressure conditions. Moreover, the valve, in addition to being thoroughly dependable under low back-pressure conditions, is dependable under high pressure conditions, and thus may be utilized in both high and low back-pressure condition situations.

Referring now to the drawings, a valve of this invention is generally indicated in FIG. 1 at 1. Valve 1 includes a body 3 having two circular members or parts 5 and 7 secured together in face-to-face relation by fasteners 9, such as bolts, for example.

The inside faces of parts 5 and 7 are provided with aligned matching cylindrical recesses 11 and 13, respectively, which together form a cavity 15. The parts 5 and 7 may be made of various materials, such as plastic or metal, for example. A diaphragm 17, which may be of any conventional impermeable diaphragm material, such as rubber or synthetic plastic, for example, extends across the cavity 15 and is clamped between parts 5 and 7. The diaphragm thus makes separate compartments or chambers of recesses 11 and 13. A ring-shaped ridge 19 on part 7 mates with a groove 21 in part 5 to clamp the diaphragm 17 securely in position.

An inlet port 23 is provided in part 5. A passage 25 leads from inlet port 23 to the recessed portion 11 of cavity 15. A cylindrical boss 27 located approximately in the center of recess 11 extends toward diaphragm 17. Boss 27 has a substantially flat seat on its outer end, and has a passage 29 therein extending to an outlet port 31. A passage 33 extends from outlet 31 to the inside face of part 5, where it is aligned and in registration with a passage 35 in parts 7 extending to the recessed portion 13 of cavity 15. Thus the recessed portion 13 is in constant communication with outlet port 31 through the passages 33 and 35.

When a negative pressure differential is created across the valve, that is to say when the pressure at the inlet port 23 exceeds the pressure at the outlet port 31, the valve allows fluid to pass therethrough and operates as follows:

The pressurized fluid enters valve 1 through inlet port 23 and passes through passage 25 into recess 11 where it bears against diaphragm 17 causing the same to flex to the right, that is to say, into the chamber defined by the recess 13 as indicated by the broken lines in FIG. 2. Communication is thereby established between passages 25 and 29 and fluid is allowed to flow through valve 1 from inlet port 23 to outlet port 31. As long as the pressure at inlet port 23 remains greater than the pressure at outlet port 31, diaphragm 17 will be biased away from the end seat of cylindrical boss 27 and into the chamber defined by recess 13, whereby fluid is allowed to pass through recess 11 and into passage 29.

However, when valve 1 is subjected to a back pressure, that is to say, when the pressure at outlet port 31 exceeds the pressure at inlet port 23, diaphragm 17 flexes in the opposite direction, that is to say moves to the left as seen in FIG. 2, and seals passageway 29. More particularly, the pressure within recess 17 at all times equals the pressure at outlet port 31 inasmuch as the two are interconnected by relatively short passages 33 and 35. When this pressure exceeds the pressure at inlet port 23 which is substantially equal to the pressure in recess 11, diaphragm 17 flexes into the chamber defined by recess 11 as indicated by the broken lines appearing in FIG. 2, and into sealing-wise engagement with the flat end seat of cylindrical boss 27 so as to preclude reverse flow of fluid out of passage 29. Once diaphragm 17 engages the flat seat of boss 27, the closure force presented on diaphragm 17 is substantially increased for the area subjected to the back pressure, that is to say, the right hand side of the diaphragm as seen in FIG. 2, is substantially greater than the area presented toward the low pressure in recess 11. Thus, a tight seal is obtained under back pressure conditions which completely blocks passage 29 and prevents any reverse flow of fluid therethrough.

Moreover, the flexure of diaphragm 17 into recess 11 under back-pressure conditions decreases the volume of the chamber formed by such recess 11 and forces a small amount of liquid out through inlet port 23. This small amount of liquid or so-called back flow can be used to perform useful work and has been found particularly useful in an apparatus for adding measured amounts of one or more fluids to other fluids, which apparatus is described in detail in my copending application Ser. No. 361,201 filed Apr. 20, 1964, now U.S. Patent 3,245,585. Generally speaking, that apparatus comprises a vertically presented cylindrical measuring chamber having an inlet at is lower end and an outlet at its upper end. The outlet inwardly terminates at a circular seat and is exteriorly connected to the inlet port 23 of a chack valve 1 of the present invention. The cylindrical chamber internally retains a measuring sphere which is carried upwardly by the momentum of the fluid passing through the chamber, which momentum is, of course, generated by a pressure differential between the inlet and outlet of the entire device. When the sphere engages the circular valve seal within the measuring cylinder, the fluid flow is immediately block. When a back pressure is presented at the outlet port 31 of the valve 1, a small amount of fluids is ejected through the inlet port 23 thereof as previously described herein, which back flow is transferred through the outlet of the measuring cylinder thereby unseating the sphere from the valve seat so it can descend through the cylinder into position for another measuring cycle. If this back flow did not occur, the measuring sphere would remain firmly engaged with the valve seat at the upper end of the measuring cylinder and the entire device would not be capable of cyclic operation.

While the valve of this invention as shown in FIG. 2 is effective in the prevention of back flow, additional force may be applied on the right-hand side of the diaphragm to cause the latter to close passage 29 by placing a compression spring in recessed portion 13 so that it will react against part 7 to force the diaphragm toward passage 29. The spring would then supplement the pressure on the right-hand side of the diaphragm for forcing the latter to the left. However, if the valve 1 is located in a system wherein fluids highly corrosive to metals are employed, a metal spring might soon be rendered useless.

A second embodiment of this invention is shown in FIG. 3 It is generally similar to the embodiment shown in FIGS. 1 and 2 and includes parts 5a and 7a secured together with a diaphragm 17a therebetween. A passage 25a leads from an inlet port 23a to a recessed portion 11a of a cavity 15a. A passage 29a extends through a cylindrical boss 27a and part 5a to the interface of the part 5a. A plug 37 closes one of the bores of port 29a. A passage 35a in part 7a registers with the interface opening of passage 29a and extends to a recessed portion 13a of cavity 15a. An outlet port 31a is connected with recessed portion 13a by a passage 39. The operation of the valve 1 shown in FIG. 3 is generally the same as the operation of the embodiment shown in FIGS. 1 and 2. When suction is applied to outlet port 31a, diaphragm 17a is drawn away from the passage 29a and fluid is drawn through the valve 1. When back pressure is created the diaphragm 17a is forced against boss 27a and closes passage 29a. Fluid forced through the valve 1 by pressure on the inlet side forces the diaphragm 17a to the right as viewed in FIG. 3 to open passage 29a.

Another embodiment is shown in FIG. 4. It also is generally similar to the embodiment shown in FIGS. 1 and 2, but the port 25b, which is similar to port 25, extends through the cylindrical boss 27b, rather than opening into the chamber at one side of the boss. The operation of this embodiment is similar to the embodiment shown in FIGS. 1 and 2.

A rectangular diaphragm 41 is illustrated in FIG. 5. This diaphragm is adapted for use in valves of this invention having rectangular recesses in the parts thereof so as to form a rectangular chamber, rather than circular recesses such as described above. If the recesses shown in FIGS. 2, 3 and 4 were rectangular rather than circular, diaphragm 41 would be used in place of diaphragms 17 or 17a. Diaphragm 41 includes a flexible border portion 43 and a relatively stiff rectangular center portion 45. Holes 47 may be provided so that bolts may pass through the diaphragm. Since pressure, when applied to a rectangular diaphragm, causes a degree of deflection from the center of the diaphragm to the sides which is different from the degree of deflection from the center to the ends, the stiffened center portion is provided so that it will seat upon the boss and close the port 29 or 29a. The flexible border portion 43, upon the creation of back pressure, will be forced toward the recess in which the boss is located so that the stiffened portion 45 is firmly held in its seated position.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A check valve for blocking a fluid line when the fluid therein is subjected to back pressures of extremely small magnitude: said check valve comprising a body having an inlet port, an outlet port, and an internal cavity; a flexible continuous unobstructed diaphragm extending across the cavity whereby the cavity is divided into first and second chambers; and a boss secured to the body and projecting inwardly through the first chamber where it terminates in a substantially planar seating face located parallel and in close proximity to the diaphragm; the body being provided with a first passage interconnecting the inlet port and first chamber, a second passage which communicates with the outlet port at one end and at its other end terminates at the seating face of the boss in the formation of an orifice, and a third passage for establishing communication between the outlet port and the second chamber; the diaphragm being adapted to flex away from the seating face so as to reduce the volume of the second chamber when the pressure at the inlet port exceeds the pressure at the outlet port whereby to establish communication between the inlet and outlet ports for the passage of fluid through the check valve, the diaphragm being adapted to flex toward the boss and into sealingwise engagement with the seating face when the pressure at the outlet port exceeds the pressure at the inlet port, whereby the orifice is blocked so as to preclude communication between the outlet and inlet ports, the diaphragm being further adapted to flex beyond the seating face when pressure at the outlet port exceeds the pressure at the inlet port to reduce the volume of the first chamber and to force a small quantity of fluid out of the inlet port to perform useful work.

2. A check valve according to claim 1 wherein the body comprises first and second matching members secured together in face-to-face relation, the members being relieved in the provision of first and second opposed matching recesses, the boss projecting into the first recess, and the diaphragm being interposed between the first and second members.

3. A check valve according to claim 1 in which the first passage extends through the boss and terminates at the seating face.

4. A check valve according to claim 2 in which the first and second recesses and the boss are cylindrical.

References Cited

UNITED STATES PATENTS

| 1,854,467 | 4/1932 | Fourness | 137—496 |
| 2,366,144 | 12/1944 | Griswold | 137—496 |
| 2,407,761 | 9/1946 | McPherson | 251—46 |

FOREIGN PATENTS 690,897  4/1953  Great Britain.

M. CARY NELSON, *Primary Examiner.*

R. J. MILLER, *Assistant Examiner.*